UNITED STATES PATENT OFFICE.

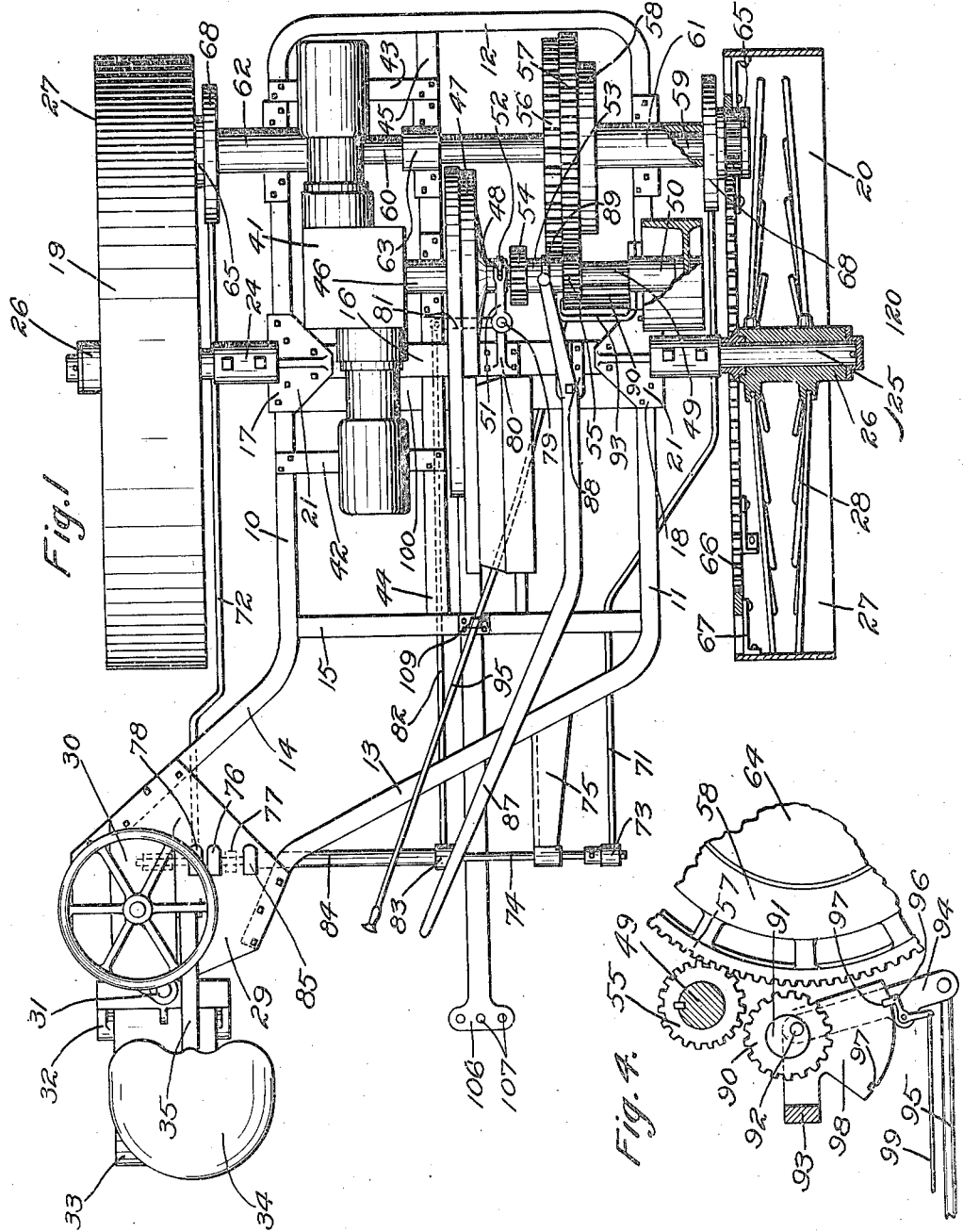

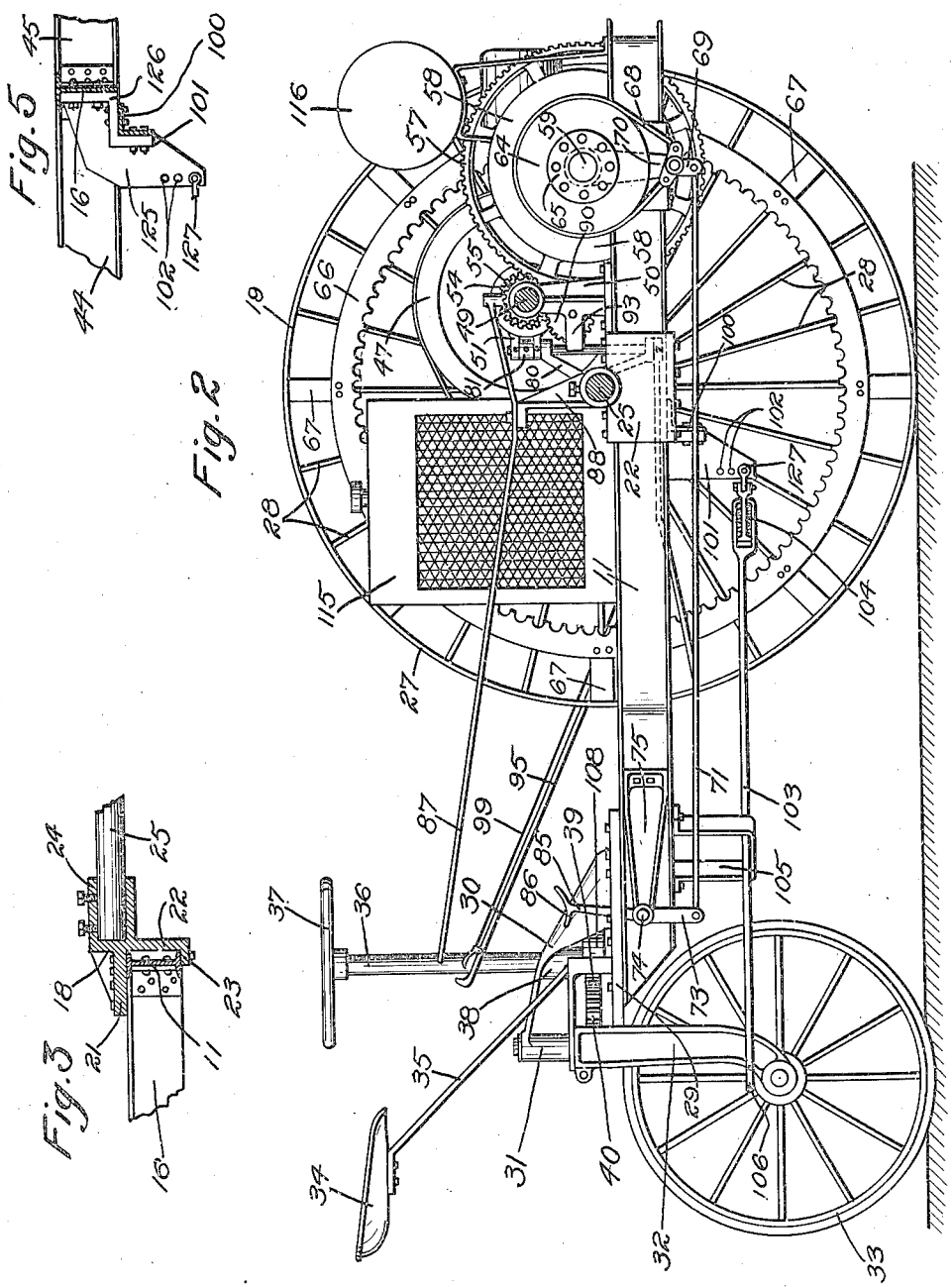

EPHRAIM M. HOLMES, OF MINNEAPOLIS, MINNESOTA, ASSIGNOR, BY DIRECT AND MESNE ASSIGNMENTS, TO CHALLENGE TRACTOR COMPANY, OF MINNEAPOLIS, MINNESOTA, A CORPORATION OF MAINE.

TRACTION-ENGINE.

1,261,388.         Specification of Letters Patent.         Patented Apr. 2, 1918.

Application filed January 3, 1916. Serial No. 69,834.

*To all whom it may concern:*

Be it known that I, EPHRAIM M. HOLMES, a citizen of the United States, residing at Minneapolis, in the county of Hennepin and State of Minnesota, have invented certain new and useful Improvements in Traction-Engines, of which the following is a specification.

My invention relates to traction engines and has for its object to provide such a traction engine having a frame adapted to support two front driving wheels and being carried angularly to the rear at one side so as to support a rear dirigible wheel directly in the line of one of said driving wheels, so that the operator who sits in proximity with the rear dirigible wheel can observe the ground upon which the plows or other implement drawn by the tractor is operating.

A further object of the invention is to arrange the engine and transmission device so that the same are supported upon the frame, principally in front of the vertical plane passing through the axis of the traction wheels, and the major part of the entire weight of the tractor thus is supported directly by the traction wheels, in this manner increasing the tractive power. This arrangement also makes practicable the mounting of the differential drive shaft for the traction wheels upon the extreme front part of the frame, thereby greatly simplifying the disposition of the parts and their accessibility for inspection, cleaning, oiling, etc.

The full objects and advantages of my invention will appear in connection with the detailed description thereof and are particularly pointed out in the claims.

In the drawings, illustrating the application of my invention in one form,—

Figure 1 is a plan view of my tractor showing some parts in section and others removed. Fig. 2 is a side elevational view of the same with one of the driving wheels removed and other parts cut away. Fig. 3 is a longitudinal elevational sectional detail of the stub axle on which the driving wheels are mounted. Fig. 4 is an enlarged elevational detail of the reversing mechanism similar to Fig. 2 but with a portion of the supporting bracket removed. Fig. 5 is a sectional detail of the drawbar connections.

My invention comprises a frame, preferably constructed of a rolled I-beam, which is bent to form parallel longitudinal portions 10 and 11, a rear portion 12 and skewed front portions 13 and 14. The longitudinal portions 10 and 11 are secured together at the rear end by a transverse frame member 15 which may be of T-shaped cross section and are also secured together near the center by a similar member 16, both of which are riveted thereto in the customary manner.

As best shown in Figs. 1 and 2, the frame proper is supported through two castings 17 and 18 upon two drive wheels 19 and 20. Castings 17 and 18 are of similar construction and, as shown in Fig. 3, comprise a shelf 21, a depending portion 22 provided with an underlying portion 23, and a projecting socketed head 24 in which is set a steel axle 25. The castings 17 and 18 are placed at the junction of the frame members 10 and 16 and also at the junction of the frame members 11 and 16, and are bolted thereto through the portions 21 and 23 of said castings. Axles 25 are mounted in the hubs 26 of the wheels 19 and 20, which are attached to the rims 27 by spokes 28 in the usual manner. It will hence be comprehended that the supporting stresses set up in axles 25 are taken up by the frame member 16 through castings 17 and 18.

The skewed portions 13 and 14 of the frame proper, as shown in Fig. 1, have attached to their ends a casting 29 which is rigidly bolted thereto. Casting 29 is provided with a heavy bracket 30 which terminates in a vertical bearing 31 in which is pivoted a fork 32 supported on a rear dirigible wheel 33. The wheel 33 is of the same width as wheel 19 and in direct alinement therewith. The seat 34 for the operator is attached to a leaf-spring 35 secured to casting 29 and is positioned over wheel 33 a little to the right of the center thereof. This arrangement permits the operator to see the ground behind the tractor to the right of him and also to have a full view of the ground on the left of the tractor.

The steering device, which is best shown in Fig. 2, is applied to the wheel 33. A vertically-positioned shaft 36 has attached to its upper end a steering wheel 37, is journaled in a bearing 38 formed in the bracket 30 and has attached to its lower end a pinion 39 which meshes with a gear segment 40 integral with the fork 32. Pinion 39 is partially housed in an enlargement 108 in the bracket 30, and gear segment 40 is positioned in the space between said bracket and the casting 29. Rotation of wheel 37 hence oscillates the fork 32 to turn the wheel 33.

The engine and transmission system with which my tractor is equipped are best shown in Fig. 1. An engine 41 is situated on the left of the tractor and is secured to bars 42 and 43 which are bolted to the portion 10 of the frame and to auxiliary frame members 44 and 45, which in turn are secured to the frame members 12, 16 and 15. A radiator 115, a fuel tank 116, and other parts common to all engines, are located as clearly shown in Figs. 1 and 2. The crank shaft of the engine is journaled in a bearing 46 which is bolted to frame member 45 and has secured to the end thereof a fly wheel 47. A shaft 49 in alinement with the crank shaft of the engine has one end journaled in a bearing 50 secured to frame portion 11 and the other end journaled in the fly wheel 47. This shaft may be coupled to the crank shaft by means of a friction clutch 48 which is operated by means to be later described. Shaft 49 carries a sleeve 53 splined thereon, said sleeve having integral therewith pinions 54 and 55 which may mesh with corresponding gears 56 and 57. Gears 56 and 57 are united and operate a differential 58 which drives two countershafts 59 and 60. Countershaft 59 is journaled in a single bearing 61 secured to the frame portion 11, and shaft 60 is journaled in a bearing 62 similar to bearing 61 attached to frame portion 10 and in a bearing 63 attached to the frame member 45. Shafts 59 and 60 have secured to the ends thereof brake drums 64 and pinions 65, which pinions mesh with corresponding internal gears 66 secured to the driving wheel rims 27 by brackets 67 bolted thereto. Shaft 49 may have a pulley 120 attached thereto for stationary power purposes.

The brake drums 64, as best seen in Fig. 2, are provided with brake bands 68, the ends of which are pivoted in T-shaped levers 69, which in turn are pivoted to supporting arms 70 issuing from the lower portion of the bearings 61 and 62. Levers 69 are connected to rods 71 and 72, by means of which the wheels 19 and 20 may be independently braked. Rod 71 is connected to a downwardly-extending arm 73 which is secured to the end of a transversely positioned shaft 74. Shaft 74 is journaled in a bracket bearing 75 attached to the frame portion 13 and in a bearing 77 integral with the casting 29, and terminates in a foot lever 76 protruding through the top of the casting 29. Rod 72 is similarly and independenly operated by a foot lever 78 closely positioned to lever 76. These levers may hence be independently or jointly operated by one foot to brake the wheels 19 and 20 as desired.

The clutch 48 is operated as follows: A short vertical shaft 79 is journaled in a bearing 80 attached to the frame member 16 and has secured to its upper end an arm 51 which is adapted to operate clutch 48 through a collar 52 in the customary manner. The lower end of shaft 79 has attached to it an arm 81 which is connected to a rearwardly-extending lever 82. Lever 82 is secured to an arm 83 similar to arm 73, which arm is secured to the end of a sleeve 84 mounted upon the brake lever shaft 74. The other end of sleeve 84 is provided with a foot lever 85 similar to the foot levers 76 and 78. It will be noted in Fig. 2 that these levers are provided with portions 86 which may be engaged by the foot to operate the same in either direction, thus eliminating the use of springs for disengaging the brakes and clutch.

The gear shifting device is best shown in Fig. 1. It comprises a single lever 87 pivoted to a casting 88 secured to the frame member 16. Lever 87 operates a collar 89 rotatably mounted on sleeve 53 which shifts said sleeve 53 to cause either of pinions 54 or 55 to mesh with its corresponding gear 56 or 57, thus giving the tractor two forward speeds.

The reversing mechanism is shown in detail in Fig. 4. A pinion 90 is rotatably mounted upon a shaft 91 in proximity to the gears 55 and 57. Shaft 91 is provided with reduced ends 92 eccentrically disposed relative thereto, by means of which said shaft is journaled in a bracket 93 issuing from the bearing 50. One of the ends 92 has attached to it an arm 94 by means of which said shaft may be oscillated to throw gear 90 simultaneously into or out of mesh with gears 55 and 57. Arm 94 is operated by a rod 95 pivoted to the end thereof, which rod extends rearwardly within reach of the operator and is held in place by means of a loose sliding bearing 109 secured to the frame member 15. Arm 94 is provided with a catch 96 engaging notches 97 in a segment 98 issuing from casting 93, which catch is operated by means of a rod 99 controlled from the end of the lever 95 in the usual manner. Pulling or pushing rod 95 hence throws gear 90 into or out of mesh with gears 55 and 57, causing an additional gear to be introduced into the train to reverse the direction of travel of the tractor. It will be comprehended that gear 90, to avoid stripping, should only be in mesh with gear 57 when gears 54 and 55 are out of mesh with gears 56 and 57.

The drawbar and the method of attachment of the same are best shown in Figs. 2 and 5. An angle beam 100 is secured to the bottom of the frame members 10, 44 and 11 somewhat to the rear of the wheel axles, and has attached to it at the center thereof a bracket 101. The bracket 101 is provided with a web member 125 and a Z-shaped portion 126 which is adapted to be bolted to both the angle 100 and the T-bar 16, thus binding the frame members rigidly together and transmitting the drawbar stresses to the wheel axles through both of these members. The web 125 is provided with a plurality of holes 102 by means of which a casting 127 may be attached thereto. Casting 127 is in turn provided with a similar number of holes arranged in a longitudinal plane for attaching a drawbar 103 in various positions relative to the frame in the usual manner. The drawbar proper is provided with a spring member 104 inserted in it for absorbing shocks and making the tractor start more easily. This spring member also provides a flexible joint in the drawbar, which is quite advantageous. The drawbar is prevented from dropping on the ground by a keeper 105 secured to the bottom of the frame portion 13, as best shown in Fig. 2, and the end of the drawbar 103 is provided with a head 106 having a series of holes 107 by means of which it may be attached to the objects to be drawn. The simple drawbar thus provided is only possible due to the fact that the dirigible wheel is offset to one side.

I claim:

1. A traction engine comprising a frame having a substantially rectangular portion formed with longitudinal side members, two traction wheels supporting said frame outside of the side members, said side members being carried rearwardly and angularly to one side, means securing said members together to form an operator's platform and mounting for the dirigible wheel directly in the rear of one of said traction wheels, and a drawbar pivotally connected with said frame near the plane of the axis of the traction wheels and extending rearwardly along the center line of said frame and to one side of said offset rear portion thereof.

2. A traction engine comprising a frame having a substantially rectangular portion formed with longitudinal side members, two traction wheels supporting said frame outside of the side members, said side members being carried rearwardly and angularly to one side, means securing said members together to form an operator's platform and mounting for the dirigible wheel directly in the rear of one of said traction wheels, and a motor and transmission system mounted upon said frame substantially in front of the vertical plane of the axis of the traction wheels and having driving connection therewith in front of said vertical plane.

3. A traction engine comprising a frame having side members, stub axles rigidly secured to the side members of said frame, traction wheels mounted upon said stub axles, a differential driving shaft journaled in the forward part of the frame and having driving connection with the traction wheels, a horizontal opposed cylinder gas engine mounted upon the frame and in part extending across said driving shaft, and a transmission system connecting the engine shaft with the driving shaft by direct spur gear drive.

4. A traction engine comprising a frame and traction wheels supporting said frame at a point near the forward end thereof, a differential driving shaft journaled across the forward end of said frame and having driving connections with the traction wheels, a horizontal opposed cylinder gas engine mounted upon the frame and in part extending across said driving shaft, and a transmission system connecting the engine shaft with the driving shaft by direct spur gear drive.

5. A traction engine comprising a frame and traction wheels supporting said frame at a point near the forward end thereof, a differential driving shaft journaled across the forward end of said frame and having driving connections with the traction wheels, an explosive engine mounted upon said frame and in part extending across said driving shaft, an engine shaft parallel with said driving shaft and a transmission system connecting said engine shaft and said driving shaft.

6. A traction engine comprising a frame having side members, stub axles rigidly secured to the side members of said frame at a point near the center thereof, traction wheels mounted upon said stub axles, elongated bearing members rigidly secured to said side members in front of said stub axles, differential shaft sections in alinement journaled in said bearing members and having driving connection with the respective traction wheels, a countershaft parallel with said differential shafts, a transmission system mounted upon said differential shafts and said countershaft, a gas engine in part extending across said differential shafts, an engine shaft in alinement with the countershaft, and means for clutching the countershaft to the engine shaft.

7. A traction engine comprising a frame having a substantially rectangular portion formed with longitudinal side members, two traction wheels supporting said frame outside of the side members, said side members being carried rearwardly and angularly to one side, means securing said members together to form an operator's platform and mounting for the steering wheel directly in the rear of one of said traction wheels, tubular bearing members rigidly secured in alinement upon the front portion of the frame, differential driving shaft sections respectively journaled in said bearing portions and each provided with a pinion having driving connections with a traction wheel, brake drums fast on each of said shaft sections close to said pinion and the outer end of the bearing member in which said shaft sections are journaled, and means including a pair of foot pedals located close together on said operator's platform and connections therefrom to the respective brake drums for operating either of said brake drums independently or both simultaneously at will.

8. A traction engine comprising a frame provided with longitudinal side members and a central transverse member, castings formed with webbed sections overlying said central members and each embracing one of said side members and being bolted thereto, axle stubs removably secured to said castings, and traction wheels journaled on said axle stubs.

9. A traction engine comprising a frame provided with longitudinal side members and a central transverse member, castings formed with webbed sections overlying said central members and each embracing one of said side members and being bolted thereto, axle stubs removably secured to said castings, traction wheels journaled on said axle stubs, a traction bar bolted transversely to the lower side of said frame members and having a drawbar connection thereon and a drawbar adjustably connected therewith.

10. A traction engine comprising a frame provided with longitudinal side members and a central transverse member, castings formed with webbed sections overlying said central members and each embracing one of said side members and being bolted thereto, axle stubs removably secured to said castings, traction wheels journaled on said axle stubs, a traction bar bolted transversely to the lower side of said frame members, a member rigidly secured to said central transverse member and said traction bar, and a drawbar adjustably connected with said last-named member.

11. A traction engine comprising a frame provided with longitudinal members and a central transverse member, a traction bar bolted transversely to the lower side of said longitudinal members in proximity to said central transverse member, a drawbar connector rigidly secured to said central member and said traction bar, and a drawbar pivotally connected with said connector member.

12. A traction engine comprising a frame provided with longitudinal members and a central transverse member, a traction bar bolted transversely to the lower side of said longitudinal members in proximity to said central transverse members, a drawbar connector rigidly secured to said central member and said traction bar, said connector member comprising a vertical web formed with a plurality of horizontal holes, and a transverse member adapted to be pivotally connected with any of said holes and having a plurality of vertical holes, and a drawbar adapted to be connected with any of the holes of said last-named member.

13. A traction engine comprising a frame and a pair of traction wheels supporting the forward portion thereof, a part of said frame being carried rearwardly and angularly to one side and forming a support for an operator's platform and a dirigible wheel directly in the rear of one of said traction wheels, means for driving the traction wheels including differential shaft sections, an engine, a transmission system and a clutch for operatively connecting the engine with the transmission system, brake drums on the differential sections for retarding the drive of one or the other traction wheels to steer the engine, a transverse shaft journaled at the rear of the frame having one end extending beneath the operator's platform, a sleeve journaled on said shaft having a connection for operating the clutch, a foot pedal on said sleeve, a pair of foot pedals located close together and connections therefrom to the brake drums including said shafts for one of said pedals for operating either of said brake drums independently or both simultaneously.

In testimony whereof I affix my signature in presence of two witnesses.

EPHRAIM M. HOLMES.

Witnesses:
F. A. WHITELEY,
H. A. BOWMAN.